(12) United States Patent
McFarland et al.

(10) Patent No.: US 11,720,805 B2
(45) Date of Patent: Aug. 8, 2023

(54) VEHICLE RECOMMENDATION SYSTEM AND METHOD

(71) Applicant: Toyota Motor North America, Inc., Plano, TX (US)

(72) Inventors: Stephen McFarland, Allen, TX (US); Armin Lange, Addison, TX (US)

(73) Assignee: Toyota Motor North America, Inc., Plano, TX (US)

( * ) Notice: Subject to any disclaimer, the term of this patent is extended or adjusted under 35 U.S.C. 154(b) by 713 days.

(21) Appl. No.: 16/696,590

(22) Filed: Nov. 26, 2019

(65) Prior Publication Data

US 2021/0158185 A1    May 27, 2021

(51) Int. Cl.
*G06N 5/04* (2023.01)
*G07C 5/00* (2006.01)
*G07C 5/08* (2006.01)

(52) U.S. Cl.
CPC .............. *G06N 5/04* (2013.01); *G07C 5/008* (2013.01); *G07C 5/0866* (2013.01)

(58) Field of Classification Search
CPC ......... G06N 5/04; G07C 5/008; G07C 5/0866
USPC .......................................................... 706/46
See application file for complete search history.

(56) References Cited

U.S. PATENT DOCUMENTS

| | | | |
|---|---|---|---|
| 4,218,672 A | 8/1980 | Schmid et al. | |
| 5,844,474 A | 12/1998 | Saling et al. | |
| 6,157,889 A | 12/2000 | Baker | |
| 8,160,806 B2 | 4/2012 | Salaka | |
| 10,832,261 B1* | 11/2020 | Chan | G06Q 40/025 |
| 2002/0087254 A1* | 7/2002 | Ryoo | B60T 7/12 |
| | | | 180/170 |
| 2013/0204493 A1* | 8/2013 | Ricci | G06F 17/00 |
| | | | 701/1 |
| 2015/0266455 A1* | 9/2015 | Wilson | G08G 1/0133 |
| | | | 701/93 |
| 2016/0086132 A1* | 3/2016 | Su | G06Q 10/083 |
| | | | 705/338 |
| 2016/0257250 A1 | 9/2016 | Zielezinski | |
| 2017/0166215 A1* | 6/2017 | Rander | B60T 8/172 |
| 2017/0351268 A1* | 12/2017 | Anderson | G08G 1/0112 |
| 2018/0052025 A1* | 2/2018 | Gao | G01M 15/05 |
| 2018/0075309 A1* | 3/2018 | Sathyanarayana | G06V 40/20 |
| 2019/0329786 A1* | 10/2019 | Kimura | B60W 40/072 |
| 2020/0111010 A1* | 4/2020 | Mezaael | H04W 4/44 |
| 2020/0164891 A1* | 5/2020 | Bender | B60W 50/0098 |
| 2021/0215491 A1* | 7/2021 | Liu | G08G 1/0129 |

OTHER PUBLICATIONS

Kattimani, Vehicular overload detection and protection, (http://www.ijlret.com/Papers/NC3PS2017/23.pdf), International Journal of Latest Research in Engineering and Technology, 2017.

* cited by examiner

*Primary Examiner* — William D Titcomb
(74) *Attorney, Agent, or Firm* — Dinsmore & Shohl LLP (57) ABSTRACT

Systems and methods are disclosed. The system is configured to determine a weight distribution of a vehicle and determine a trajectory associated with the vehicle. The system is further configured to generate a vehicle recommendation based on the weight distribution of the vehicle and the trajectory associated with the vehicle.

20 Claims, 8 Drawing Sheets

FIG. 5D

VEHICLE RECOMMENDATION SYSTEM AND METHOD

TECHNICAL FIELD

The present specification generally relates to vehicle recommendation systems and, more particularly, vehicle recommendation systems that are configured to generate a vehicle recommendation based on a weight distribution of the vehicle.

BACKGROUND

Conventionally, vehicles are utilized to transport load components from one location to another location. As an example, a pickup truck may include a bed with the load components disposed thereon, and a user of the pickup truck may manually load the load components onto the bed of the pickup truck. As another example, a semi-trailer truck may include a container with the load components disposed therein, and a loading apparatus, such as a forklift, may load the load components into the container. During the loading process, the load components may be disposed at various locations of the bed or the container of the vehicle. Accordingly, the weight distribution of the vehicle may vary based on, for example, the weight, dimensions, and center of gravity of the load components.

However, certain weight distributions of the vehicle may cause undesirable operating conditions for the vehicle. As an example, a weight distribution indicating that a majority of the weight of the load components are applied to a particular side of the vehicle may cause the vehicle to overturn during operation. As another example, a weight distribution indicating that a majority of the weight of the load components are applied to a particular side of the vehicle may impair braking functions. Moreover, an operator of the vehicle may be unaware of the improper weight distribution of the vehicle, thereby preventing the user from taking necessary precautions in order to accommodate for the improper weight distribution.

Accordingly, a need exists for vehicle recommendation systems that are configured to notify a user of an improper weight distribution and to generate a vehicle recommendation based on the improper weight distribution.

SUMMARY

In one embodiment, a system is disclosed and includes one or more processors and one or more non-transitory memory modules communicatively coupled to the one or more processors. The one or more non-transitory memory modules store machine-readable instructions that, when executed, cause the one or more processors to determine a weight distribution of a vehicle. When the machine-readable instructions are executed, the one or more processors determine a trajectory associated with the vehicle. When the machine-readable instructions are executed, the one or more processors generate a vehicle recommendation based on the weight distribution of the vehicle and the trajectory associated with the vehicle.

In another embodiment, a method is disclosed and includes determining a weight distribution of a vehicle based on weight data from one or more weight sensors. The method includes determining a trajectory associated with the vehicle. The method also includes generating a vehicle recommendation based on the weight distribution of the vehicle and the trajectory associated with the vehicle.

In one embodiment, a vehicle is disclosed and includes one or more processors and one or more non-transitory memory modules communicatively coupled to the one or more processors. The one or more non-transitory memory modules store machine-readable instructions that, when executed, cause the one or more processors to determine a weight distribution of the vehicle. When the machine-readable instructions are executed, the one or more processors determine a trajectory associated with the vehicle. When the machine-readable instructions are executed, the one or more processors generate a vehicle recommendation based on the weight distribution of the vehicle and the trajectory associated with the vehicle.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The embodiments set forth in the drawings are illustrative and exemplary in nature and are not intended to limit the subject matter defined by the claims. The following detailed description of the illustrative embodiments can be understood when read in conjunction with the following drawings, where like structure is indicated with like reference numerals and in which:

DETAILED DESCRIPTION

Referring generally to the figures, embodiments of the present disclosure are generally related to vehicle recommendation systems. In some embodiments, a vehicle includes one or more weight sensors disposed therein, and the one or more weight sensors are configured to output data corresponding to the weight of the load components disposed in the vehicle. Based on the weight data output by the one or more weight sensors, the vehicle recommendation system may determine a weight distribution of the vehicle and generate a recommendation corresponding to the weight distribution. As a non-limiting example, if the weight distribution indicates that a certain area of the vehicle is overloaded compared to the rest of the vehicle, the vehicle recommendation system may generate a recommendation with text and/or graphics indicating that the identified area of the vehicle is overloaded.

In addition to generating a recommendation corresponding to the weight distribution, the vehicle recommendation system may generate a recommendation based on the weight distribution. In some embodiments, the recommendation may indicate a suggested vehicle speed, a suggested lane of a roadway system, a suggested magnitude of steering wheel rotation based on the weight distribution, or combinations thereof, as described below in further detail. Accordingly, the vehicle recommendation system may improve vehicle operation and maintain a mechanical robustness of the vehicle during operation when, for example, a particular portion of the vehicle is overloaded, as described herein.

Figure 1A:
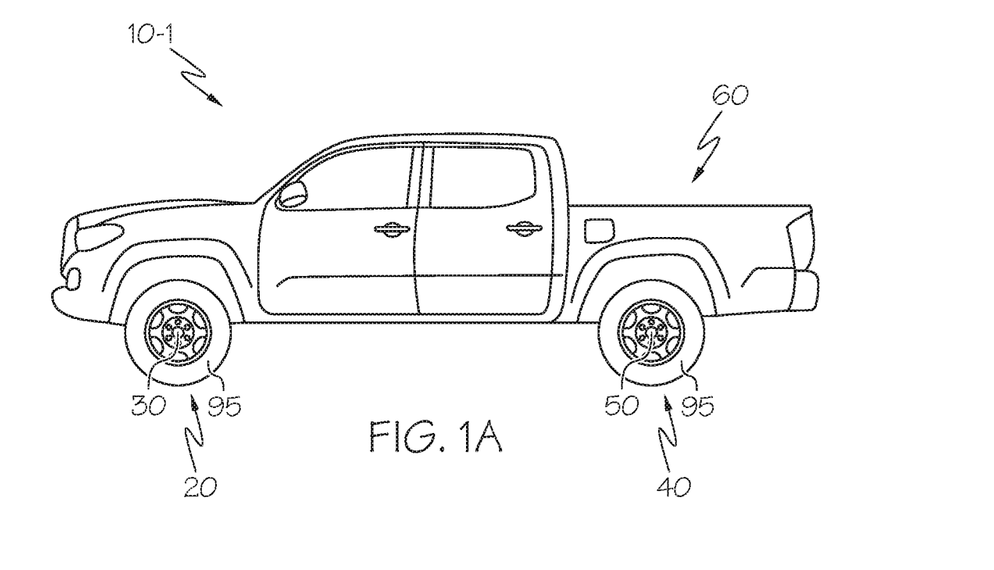
FIG. 1A schematically depicts a side view of an example vehicle according to one or more embodiments shown and described herein.
Figure 1B:
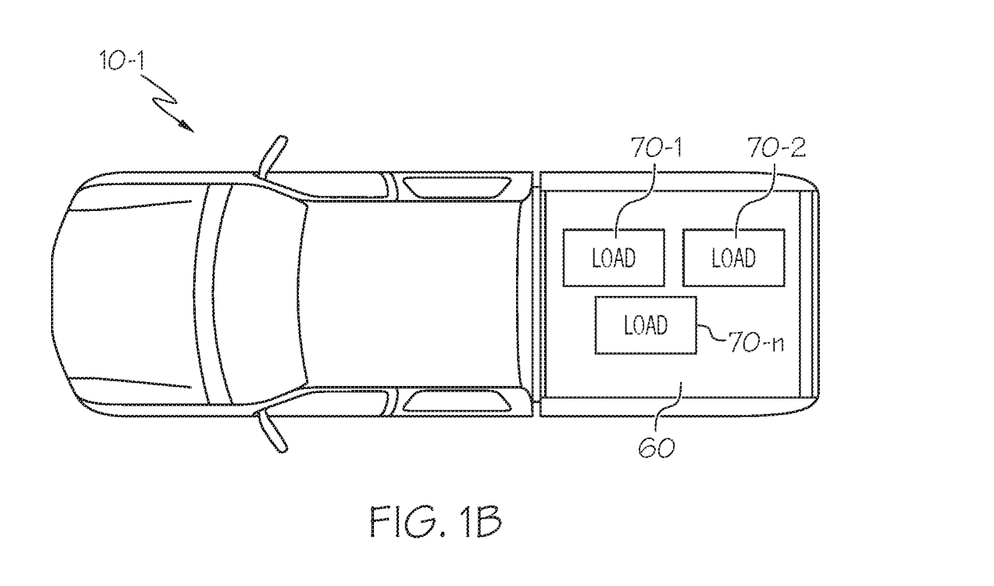
FIG. 1B schematically depicts a top view of an example vehicle according to one or more embodiments shown and described herein.

Referring now to FIGS. 1A-1B, side and top views, respectively, of vehicle 10-1 are schematically depicted. In some embodiments, the vehicle 10-1 may be a pickup truck, light duty truck, or other similar vehicle. It should be understood that the vehicle 10-1 may be other types of vehicles in other embodiments, such as a sedan, sport utility vehicle, minivan, etc. In the illustrated embodiment, front wheels 20 of the vehicle 10-1 are connected using a front axle 30, and rear wheels 40 of the vehicle 10-1 are connected using a rear axle 50. Furthermore, each of the front wheels 20 and the rear wheels 40 may include a respective tire 95.

As depicted in the illustrated embodiment, the vehicle 10-1 may include a bed 60 that is configured to receive load components 70-1, 70-2, . . . 70-n (collectively referred to as load components 70). The load components 70 may be disposed at various locations of the bed 60. In some embodiments, the vehicle 10-1 may have various weight distributions that are based on, for example, the weight of the load components 70, the dimensions of the load components 70, the center of gravity of the load components 70, the position of the load components 70 within the bed 60, and other physical characteristics of the load components 70. The weight distribution of the vehicle 10-1 may be determined using, for example, one or more weight sensors and a weight distribution module, as described below in further detail with reference to FIG. 3.

Figure 2A:
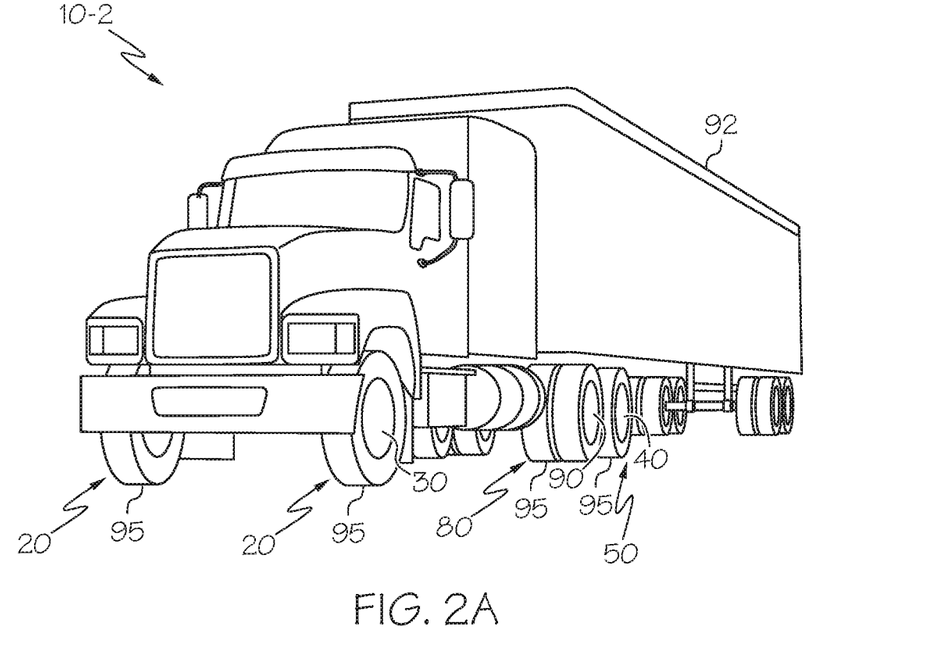
FIG. 2A schematically depicts a perspective view of another example vehicle according to one or more embodiments shown and described herein.
Figure 2B:
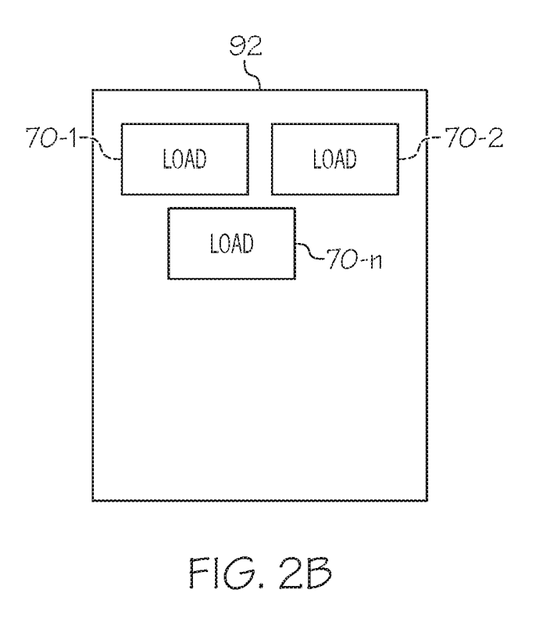
FIG. 2B schematically depicts a partial top view of another example vehicle according to one or more embodiments shown and described herein.

With reference to FIGS. 2A-2B, a side view and a partial top view, respectively, of vehicle 10-2 are schematically depicted. In some embodiments, the vehicle 10-2 may be a semi-trailer truck or other similar type vehicle. Similar to vehicle 10-1 described above with reference to FIGS. 1A-1B, the front wheels 20 of the vehicle 10-2 are connected by the front axle 30, and the rear wheels 40 of the vehicle 10-2 are joined by the rear axle 50. Additionally, the vehicle 10-2 may include at least one set of additional wheels 80 that are joined by a respective axle 90.

As illustrated in FIG. 2B, the vehicle 10-2 may be attached to a container 92 that is configured to receive load components 70. Similar to vehicle 10-1, the weight distribution of the vehicle 10-2 may be determined using, for example, one or more weight sensors and the weight distribution module, as described below in further detail.

In some embodiments, a loading apparatus (not shown) may load the load components 70 into the container 92 and determine the weight of the load components 70 prior to loading the load components 70 into the container 92. As a non-limiting example, the loading apparatus, which may be a forklift or other similar apparatus, may retrieve the first load component 70-1 from a first location (e.g., a pallet). Once the loading apparatus retrieves the first load component 70-1, a weight sensor disposed on the loading apparatus (e.g., one or more pressure sensors disposed on the forklift) is configured to generate data representing the weight of the first load component 70-1. The weight data may be transmitted to a weight distribution module (shown below) of the vehicle 10-2 using any suitable wireless communication protocol (e.g., a Bluetooth link, Bluetooth Low Energy link, Wi-Fi link, cellular link, ultra-wide band (UWB) link, etc.). In response to receiving the weight data, a vehicle recommendation module (shown below) of the vehicle 10-2 may select a location of the container 92 to load the first load component 70-1 such that the vehicle 10-2 has an optimal weight distribution, as described below in further detail with reference to FIG. 3.

Furthermore, once the loading apparatus retrieves the second load component 70-2, the weight sensor disposed on the loading apparatus may generate and transmit the weight data to the weight distribution module of the vehicle 10-2. Likewise, the vehicle recommendation module (shown below) of the vehicle 10-2 may select a location of the container 92 to load the second load component 70-2 such that the vehicle 10-2 maintains the optimal weight distribution and may select the location based on the location, weight, and dimensions of the first load component 70-1. Accordingly, the vehicle recommendation module of the vehicle 10-2 may select a location to load each subsequent load component 70-n such that the vehicle 10-2 maintains an optimal weight distribution and may select the location based on the location, weight, and dimensions of each prior load component 70, as described below in further detail.

While the above embodiment describes the weight of the load components 70 being determined by the loading apparatus, in some embodiments, the weight of the load components 70 may be determined by one or more weight sensors (e.g., tire pressure sensors) of the vehicle. As a non-limiting example, when the load components 70 are loaded into the bed 60 or the container 92 of the vehicle, the load component 70 may exert a force on the bed 60 or the container 92 of the vehicle. The applied force may cause the tires 95 to deform, thereby increasing the pressure of the tires 95. Accordingly, the tire pressure sensors may be configured to generate and transmit a signal representing the pressure of the tires 95. The weight distribution module (shown below), which is in communication with the tire pressure sensors, may then determine a weight distribution of the vehicle by, for example, determining the weight applied to at least one of the rear axle 50, the front axle 30, and the additional axles 90 based on the signals transmitted by the tire pressure sensors. Furthermore, the weight distribution module may determine the weight applied to a particular portion of the respective axles (e.g., an amount of weight applied to a right side of the front axle 30).

Based on the determined weight distribution of the vehicle, the vehicle recommendation module (shown below) of the vehicle may generate a recommendation indicating whether the weight distribution of the vehicle is at or near an optimal weight distribution. In some embodiments, when the weight distribution is not at or near the optimal weight distribution, the vehicle recommendation module may generate a recommendation indicating that a position of at least one of the load components 70 needs to be adjusted in order to achieve an improved or optimal weight distribution of the vehicle, as described below in further detail.

By optimizing the weight distribution, the vehicle can operate at an optimal vehicle stability and braking capability, thereby improving the operation of the vehicle. Furthermore, by maintaining an optimal weight distribution, the weight applied to any one of the rear axle 50, the front axle 30, and the additional axles 90 will remain below a threshold weight value, thereby ensuring that the rear axle 50, the front axle 30, and the additional axles 90 maintain a sufficient mechanical robustness during operation. In other words, the various components of the front axle 30, the rear axle 50, and the additional axles 90, and/or other components attached thereto, such as a suspension component, a strut, steering knuckle, etc., will refrain from being damaged or breaking due to an excess load weight and/or improper weight distribution.

Figure 3:
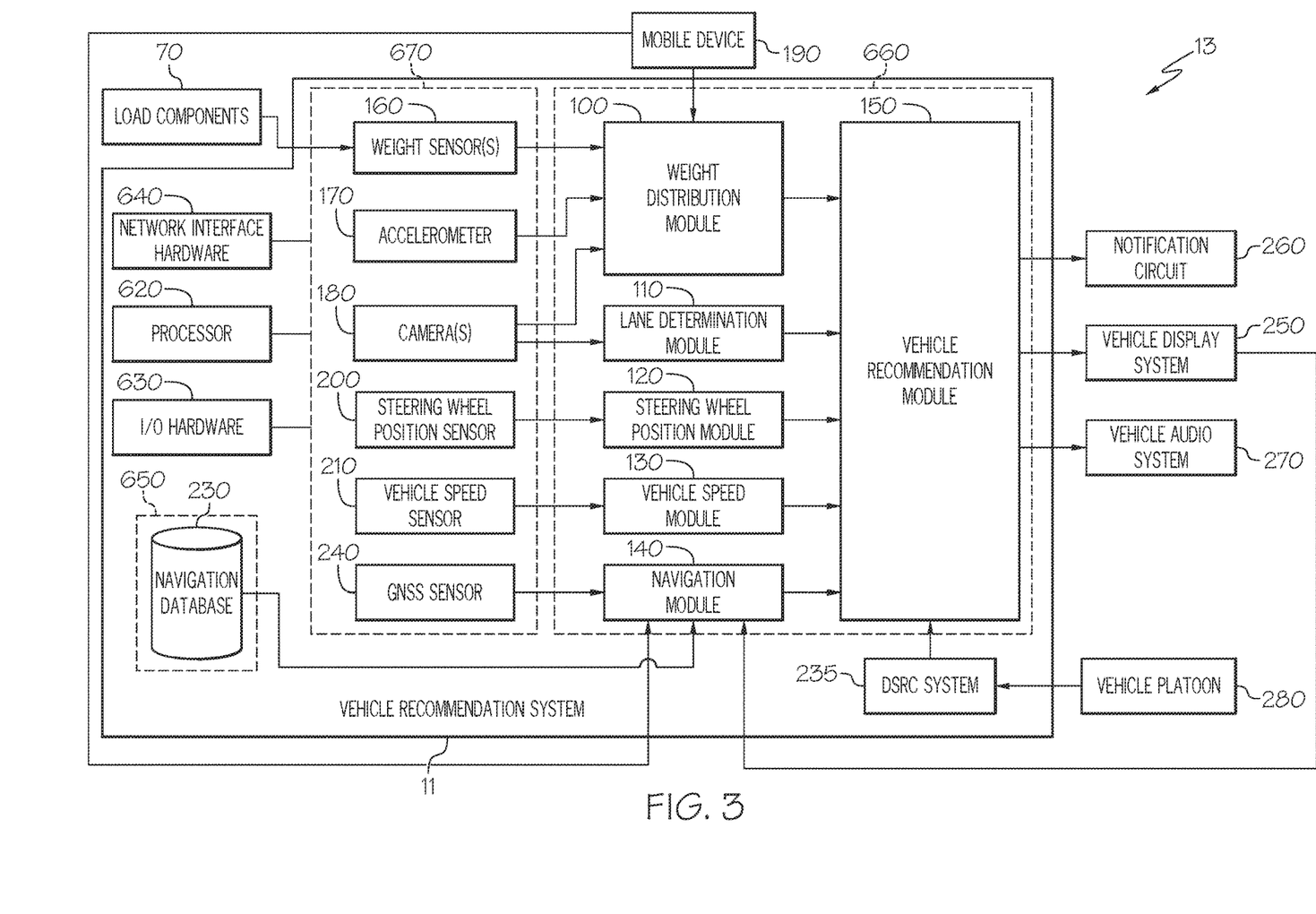
FIG. 3 schematically depicts an apparatus including a vehicle recommendation system according to one or more embodiments shown and described herein.

With reference to FIG. 3, an apparatus 13 including a vehicle recommendation system 11 is schematically depicted. The apparatus 13 includes the load components 70, the vehicle recommendation system 11, a mobile device 190, a vehicle platoon 280, a notification circuit 260, a vehicle display system 250, and a vehicle audio system 270.

In the illustrated embodiment, the vehicle recommendation system 11, which may be included in the vehicle 10-1, the vehicle 10-2 or any other vehicle, includes a dedicated short-range communication (DSRC) system 235, a processor 620, input/output hardware 630, network interface hardware 640, a data storage component 650, a non-transitory computer-readable medium 660, and vehicle sensors 670. The non-transitory computer-readable medium 660 includes a weight distribution module 100, a lane determination module 110, a steering wheel position module 120, a vehicle speed module 130, a navigation module 140, and a vehicle recommendation module 150. The vehicle sensors 670 may include one or more weight sensors 160, an accelerometer 170, one or more cameras 180, a steering wheel position sensor 200, a vehicle speed sensor 210, and a global navigation satellite system (GNSS) sensor 240. The data storage component 650 includes a navigation database 230. While the navigation database 230 is shown externally to the vehicle recommendation system 11, in some embodiments, the navigation database 230 may be included within the vehicle recommendation system 11.

The one or more weight sensors 160 are communicatively coupled with the weight distribution module 100 and in physical communication with the load components 70 such that the one or more weight sensors 160 output one or more signals indicative of the weight of the load components 70. The accelerometer 170 is communicatively coupled to the weight distribution module 100 and configured to output a signal indicative of a sensed acceleration. The one or more cameras 180 are communicatively coupled to the weight distribution module 100 and the lane determination module 110 and configured to output image data. The steering wheel position sensor 200 is communicatively coupled to the steering wheel position module 120 and configured to output a signal indicative of a position of a vehicle steering wheel. The vehicle speed sensor 210 is communicatively coupled to the vehicle speed module 130 and configured to output a signal indicative of a vehicle speed. The GNSS sensor 240 is communicatively coupled to the navigation module 140 and configured to output a signal indicative of a location. The DSRC system 235 receives information from the vehicle platoon 280, is communicatively coupled to the vehicle recommendation module 150, and is configured to output vehicle recommendations generated by other vehicles of the vehicle platoon 280.

The various components of the apparatus 13 may be communicatively coupled using a communication interface, which is formed from any medium that is configured to transmit a signal. As non-limiting examples, the communication interface is formed of conductive wires, conductive traces, optical waveguides, or the like. The communication interface may also refer to the expanse in which electromagnetic radiation and their corresponding electromagnetic waves traverses. Moreover, the communication interface may be formed from a combination of mediums configured to transmit signals. In one embodiment, the communication interface comprises a combination of conductive traces, conductive wires, connectors, and buses that cooperate to permit the transmission of electrical data signals to and from the various components of the apparatus 13. Additionally, it is noted that the term "signal" means a waveform (e.g., electrical, optical, magnetic, mechanical or electromagnetic) configured to travel through a medium, such as DC, AC, sinusoidal-wave, triangular-wave, square-wave, vibration, and the like.

The processor 620 may be any device of capable of executing machine-readable instructions stored in the non-transitory computer-readable medium 660. As a non-limiting example, the processor 620 may be one of a shared processor circuit, dedicated processor circuit, or group processor circuit. As described herein, the term shared processor circuit refers to a single processor circuit that executes some or all machine-readable instructions from the multiple modules (i.e., the weight distribution module 100, the lane determination module 110, the steering wheel position module 120, the vehicle speed module 130, the navigation module 140, and the vehicle recommendation module 150). As described herein, the term group processor circuit refers to a processor circuit that, in combination with additional processor circuits, executes some or all machine-executable instructions from the multiple modules. References to multiple processor circuits encompass multiple processor circuits on discrete dies, multiple processor circuits on a single die, multiple cores of a single processor circuit, multiple threads of a single processor circuit, or a combination of the above.

The input/output hardware 630 may refer to a basic input/output system (BIOS) that interacts with hardware of the vehicle recommendation system 11, device drivers that interact with particular devices of the vehicle recommendation system 11, one or more operating systems, user applications, background services, background applications, etc. The network interface hardware 640 may include and/or be configured to communicate with any wired or wireless networking hardware, including an antenna, a modem, a LAN port, wireless fidelity (Wi-Fi) card, WiMax card, ZigBee card, Bluetooth chip, USB card, mobile communications hardware, and/or other hardware for communicating with other networks and/or devices. The data storage component 650, which includes the navigation database 230, is communicatively coupled to the processor 620. As a non-limiting example, the data storage component 650 may include one or more database servers that support NoSQL, MySQL, Oracle, SQL Server, NewSQL, or the like.

The non-transitory computer-readable medium 660 is communicatively coupled to the processor 620. As a non-limiting example, non-transitory computer-readable medium 660 may be one of a shared memory circuit, dedicated memory circuit, or group memory circuit. As described herein, the term shared memory circuit refers to a single memory circuit that stores some or all machine-readable instructions from the multiple modules (i.e., the weight distribution module 100, the lane determination module 110, the steering wheel position module 120, the vehicle speed module 130, the navigation module 140, and the vehicle recommendation module 150). As described herein, the term group memory circuit refers to a memory circuit that, in combination with additional memories, stores some or all machine-readable instructions from the multiple modules.

A description of the various modules of the vehicle recommendation system 11 will now be provided. As described herein, the term module may refer to, be part of, or include: an Application Specific Integrated Circuit (ASIC); a digital, analog, or mixed analog/digital discrete or integrated circuit; a combinational logic circuit; a field programmable gate array (FPGA); a processor circuit that executes machine-readable instructions; a memory circuit that stores machine-readable instructions executed by the processor circuit; other suitable hardware components that provide the described functionality; or a combination of some or all of the above.

The weight distribution module 100 is configured to receive input from one or more of the mobile device 190, the one or more weight sensors 160, the accelerometer 170, or the one or more cameras 180, determine a weight distribution based on the received input, and provide the determined weight distribution to the vehicle recommendation module 150. Further details regarding the operation of the weight distribution module 100 are provided below, for example with reference to step 405 of FIG. 4.

The lane determination module 110 is configured to receive input from the one or more cameras 180, determine a lane occupied by the vehicle to which the vehicle recommendation system 11 is attached based on the input from the one or more cameras 180, and provide the determined lane to the vehicle recommendation module 150. Further details regarding the operation of the lane determination module 110 are provided below, for example with reference to step 425 of FIG. 4.

The steering wheel position module 120 is configured to receive input from the steering wheel position sensor 200, determine a steering wheel position based on the input from the steering wheel position sensor 200, and provide the determined steering wheel position to the vehicle recommendation module 150. Further details regarding the operation of the steering wheel position module 120 are provided below, for example with reference to step 410 of FIG. 4.

The vehicle speed module 130 is configured to receive input from the vehicle speed sensor 210, determine a vehicle speed based on the input from the vehicle speed sensor 210, and provide the determined vehicle speed to the vehicle recommendation module 150. Further details regarding the operation of the vehicle speed module 130 are provided below, for example with reference to step 415 of FIG. 4.

The navigation module 140 is configured to receive input from the GNSS sensor 240, the mobile device 190, and/or the navigation database 230. The navigation module 140 is configured to determine a trajectory of the vehicle based on the received inputs, and provide the determined trajectory to the vehicle recommendation module 150. Further details regarding the operation of the navigation module 140 are provided below, for example with reference to step 420 of FIG. 4.

The vehicle recommendation module 150 is configured to receive input from one or more of the weight distribution module 100, the lane determination module 110, the steering wheel position module 120, the vehicle speed module 130, the navigation module 140, and the DSRC system 235. Based on the received input, the vehicle recommendation module 150 is configured to generate and output a vehicle recommendation to one or more of the notification circuit 260, the vehicle display system 250, or the vehicle audio system 270. Further details regarding the operation of the vehicle recommendation module 150 are provided below, for example with reference to step 435 of FIG. 4.

Figure 4:
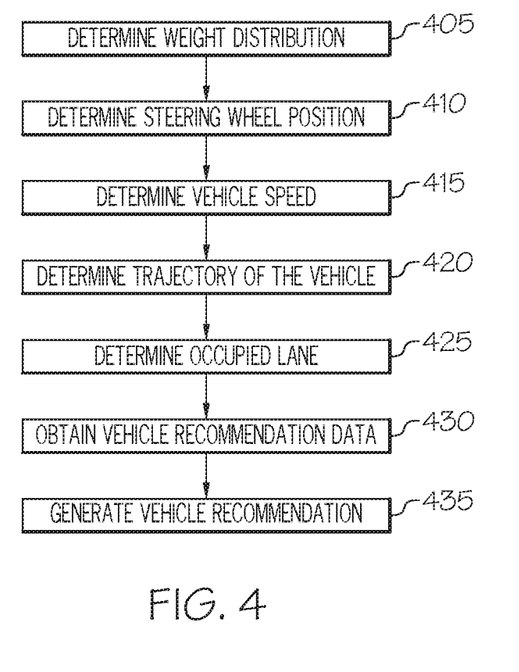
FIG. 4 depicts a flow diagram illustrating an example vehicle recommendation method according to one or more embodiments shown and described herein.

With reference to FIG. 4, a flow diagram illustrating an example vehicle recommendation method is schematically depicted. The flow diagram elements described herein may be translated into machine-readable instructions. As non-limiting examples, the machine-readable instructions may be written using any programming protocol, such as: descriptive text to be parsed (e.g., such as hypertext markup language, extensible markup language, etc.), (ii) assembly language, (iii) object code generated from source code by a compiler, (iv) source code written using syntax from any suitable programming language for execution by an interpreter, (v) source code for compilation and execution by a just-in-time compiler, etc. Alternatively, the machine-readable instructions may be written in a hardware description language (HDL), such as logic implemented via either an FPGA configuration or an ASIC, or their equivalents. Accordingly, the functionality described herein may be implemented in any conventional computer programming language, as pre-programmed hardware elements, or as a combination of hardware and software components.

While the steps shown in FIG. 4 are shown as all occurring and in a particular order, in other embodiments one or more of the steps may not be performed, and in some embodiments, one or more of the steps may be performed in a different order as shown and described herein.

Referring to FIG. 4 in conjunction with FIG. 3, at step 405, the vehicle recommendation system 11 determines the weight distribution. In some embodiments, the vehicle recommendation system 11 determines the weight distribution based on data received from the one or more weight sensors 160. In some embodiments, the weight distribution module 100 is configured to determine a weight distribution of the vehicle based on the load components 70. As a non-limiting example, the one or more weight sensors 160 may be implemented by a plurality of tire pressure sensors, wherein each tire pressure sensor is associated with a respective tire 95 of the vehicle. The plurality of tire pressure sensors may be configured to generate pressure data corresponding to the weight of the load components 70. In one embodiment, when the vehicle does not include any load components 70, the plurality of tire pressures may generate signals corresponding to a nominal force value. Accordingly, the weight distribution module 100 may be configured to determine that the vehicle is unloaded when the pressure data corresponds to the nominal force value. It should be understood that in some embodiments, the nominal force values may be adjusted and/or based on an ambient temperature, a design of the tire, a material of the tire, etc.

In some embodiments, when the vehicle includes the load components 70, the plurality of tire pressures may generate signals indicating a pressure value greater than the nominal force value. Accordingly, the weight distribution module 100 may determine that the vehicle includes the load components 70 based on the signals of the one or more weight sensors 160 indicating a pressure value greater than the nominal force value. In addition to determining that the vehicle includes the load components 70, the weight distribution module 100 may be configured to determine the weight of the load components 70 based on the pressure values generated by the tire pressure sensors.

When the weight distribution module 100 determines that the vehicle includes the load components 70, the weight distribution module 100 may determine a weight distribution of the vehicle. In an example embodiment, each of the one or more weight sensors 160, which may be a plurality of tire pressure sensors, is configured to generate and transmit pressure data to the weight distribution module 100. As a non-limiting example, a first tire pressure sensor may generate and transmit pressure data having a first pressure value, a second tire pressure sensor may generate and transmit pressure data having a second pressure value, a third tire pressure sensor may generate and transmit pressure data having a third pressure value, and a fourth tire pressure sensor may generate and transmit pressure data having a fourth pressure value (collectively referred to as pressure values). In response to receiving the pressure values from the tire pressure sensors, the weight distribution module 100 may determine a weight of the load components 70. As a non-limiting example, the weight distribution module 100 may determine that weight of the load components 70 is 500 pounds.

Based on the weight applied to at least a portion of the front axle 30 and the rear axle 50, the weight distribution module 100 may determine a center of gravity of the load components 70. In one example embodiment, the weight distribution module 100 may approximate and/or determine a position of the load components 70 based on the weight applied to at least a portion of the front axle 30 and the rear axle 50. Subsequently, the weight distribution module 100 may determine a center of gravity of the load components 70 based on the determined/approximated position of the load components 70 and a distance between the front axle 30 and the rear axle 50 of the vehicle. As a non-limiting example, a horizontal center of gravity of the load components 70 may be determined based on a wheelbase length (i.e., the distance between the front axle 30 and the rear axle 50) and the determined/approximated position of the load components 70.

Subsequently, the weight distribution module 100 may determine a weight distribution of the vehicle based on center of gravity and the weight of the load components 70. As a non-limiting example, the weight distribution module 100 may determine that 80% of the weight of the load components 70 is being applied to the front axle 30; and 20% of the weight of the load components 70 is being applied to the rear axle 50. As another non-limiting example, the weight distribution module 100 may determine that 55% of the weight of the load components 70 is being applied to the front axle 30; and 45% of the weight of the load components 70 is being applied to the rear axle 50. Based on the weight distribution, the vehicle recommendation module 150 may generate a notification corresponding to the weight distribution, as described below in further detail. It should be understood that in other embodiments, different methods may be utilized to determine the weight distribution of the vehicle.

As described above, in some embodiments, the weight distribution module 100 may receive the weight data from the mobile device 190 in communication with a loading apparatus (not shown). As a non-limiting example, the loading apparatus, which may be a forklift, may retrieve the first load components 70-1 from a first location (e.g., a pallet). The one or more weight sensors disposed on the loading apparatus (e.g., one or more pressure sensors disposed on the forklift), which are configured to generate data representing weight of the load components 70, may transmit weight data to the weight distribution module 100 using any suitable wireless communication protocol (e.g., Bluetooth Low Energy link, Wi-Fi link, cellular link, etc.). Accordingly, once the first load component 70-1 is loaded into the bed 60 or the container 92 of the vehicle, the weight distribution module 100 may determine a weight distribution of the vehicle, as described above.

Furthermore, when the first load component 70-1 is loaded into the bed 60 or the container 92 of the vehicle, the loading apparatus may retrieve the second load component 70-2 from the first location. Accordingly, the weight distribution module 100 may retrieve the weight data corresponding to the second load component 70-2, and based on the weight data, the weight distribution module 100 may determine a location within the bed 60 or the container 92 to load the second load component 70-2 such that the vehicle maintains an optimal weight distribution. As a non-limiting example, the weight distribution module 100 may determine that the second load component 70-2 needs to be loaded near the rear of the bed 60 in order to ensure that 50% of the weight of the load components 70 is being applied to the front axle 30 and rear axle 50. It should be understood that the weight distribution module 100 may determine a location within the bed 60 or the container 92 to load each additional load component 70-n in order to ensure that the vehicle maintains the optimal weight distribution.

In some embodiments, the weight distribution module 100 is configured to determine whether the weight distribution of the vehicle has changed during operation and in response to, for example, the load components 70 moving due to an external force, such as a vibration, shock force, etc. In one example embodiment, the weight distribution module 100 may determine that the load components 70 have moved if acceleration data from the accelerometer 170 indicates a rapid movement while the vehicle is in operation. In some embodiments, the weight distribution module 100 may determine that the load components 70 have moved while the vehicle is operating if the one or more cameras 180 obtain image data that does not match image data obtained by the one or more cameras 180 prior to operating the vehicle. In order to make this determination, the weight distribution module 100 may execute image processing algorithms, and the image processing algorithms may be implemented by, for example, a machine learning algorithm or other suitable algorithm.

In response to determining that the weight distribution of the vehicle has changed due to the movement of the load components 70 while the vehicle is operating, the weight distribution module 100 may determine an updated weight distribution of the vehicle. Based on the updated weight distribution, the vehicle recommendation module 150 may generate an updated notification corresponding to the updated weight distribution, as described below in further detail.

Referring back to FIG. 4 in conjunction with FIG. 3, at step 410, the vehicle recommendation system 11 determines the steering wheel position. In some embodiments, the vehicle recommendation system 11 determines the steering wheel position based on sensor data received from the steering wheel position sensor 200. In some embodiments, the steering wheel position module 120 may be configured to determine a position of a steering wheel of the vehicle. In the illustrated embodiment, the steering wheel position module 120 receives a signal from the steering wheel position sensor 200, wherein the signal may indicate a degree of rotation of the steering wheel. As a non-limiting example, the signal may indicate that the degree of rotation is 0° (i.e., the vehicle is traveling on a straight road), 30° (e.g., the vehicle is making a slight right), or greater than 180° (e.g., the vehicle is making a sharp right). Some embodiments may not include step 410.

At step 415, the vehicle recommendation system 11 determines the speed of the vehicle. In some embodiments, the vehicle recommendation system 11 determines the speed of the vehicle based on the data obtained by the vehicle speed sensor 210. In various embodiments, the vehicle speed module 130 may be configured to determine a speed of the vehicle. In the illustrated embodiment, the vehicle speed module 130 receives a signal from the vehicle speed sensor 210, which may be a wheel speed sensor associated with at least one of the front wheels 20 and the rear wheels 40 of the vehicle. Based on the signals received by the vehicle speed sensor 210, the vehicle speed module 130 may determine a speed of the vehicle. Some embodiments may not include step 415.

At step 420, the vehicle recommendation system 11 determines the trajectory of the vehicle. In some embodiments, the vehicle recommendation system 11 determines the trajectory of the vehicle based on trajectory data obtained by the GNSS sensor 240 and/or the predetermined trajectory of the vehicle obtained via one of the mobile device 190 and the vehicle display system 250. In some embodiments, the navigation module 140 may be configured to obtain a trajectory associated with the vehicle. In some embodiments, the navigation module 140 of the vehicle recommendation system 11 determines the trajectory of the vehicle based on a direction and speed reading output by the GNSS sensor 240. As a non-limiting example, the navigation module 140 may receive vehicle navigation instructions indicating an originating location, a destination, and roads that the vehicle may use during operation from a navigation application executed by the mobile device 190 or the vehicle display system 250. Furthermore, the navigation module 140 may compare the originating location, destination, and the identified roads to entries in the navigation database 230 in order to obtain relevant characteristics associated therewith and determine the trajectory based thereon. As a non-limiting example, one or more entries in the navigation database 230 may indicate that the identified roads have varying elevations and a plurality of sharp curves and bends.

In some embodiments, the navigation module 140 may receive location data associated with the vehicle from the GNSS sensor 240 (e.g., a GPS sensor), and the navigation module 140 may compare the location data to entries in the navigation database 230 in order to obtain the relevant characteristics associated therewith. The system may determine the vehicle trajectory based on the received location data from the GNSS sensor 240.

Referring to FIG. 4 in conjunction with FIG. 3, at step 425, the vehicle recommendation system 11 determines an occupied lane of the roadway system. In some embodiments, the vehicle recommendation system 11 determines the occupied lane based on image data obtained by the one or more cameras 180. In some embodiments, the lane determination module 110 may determine which lane of a roadway system that the vehicle is currently occupying. In the illustrated embodiment, the lane determination module 110 receives image data from the one or more cameras 180. In some embodiments, the one or more cameras 180 may be configured to obtain image data of an exterior of the vehicle, such as a front of the vehicle, a rear of the vehicle, and/or a side of the vehicle. As a non-limiting example, the one or more cameras 180 may be configured to obtain image data corresponding to certain features of the roadway, such as lane markings, sidewalks, traffic lights, crosswalks, and other similar features of the roadway system. Based on the image data representing the features of the roadway system, the lane determination module 110 is configured to determine which lane the vehicle is currently occupying within the roadway system. In order to make this determination, the lane determination module 110 may be configured to perform image processing algorithms, and the image processing algorithms may be implemented by, for example, a machine learning algorithm or other suitable algorithms.

As a non-limiting example, the one or more cameras 180 may capture an image indicating that the vehicle is immediately adjacent to a sidewalk on a right side of the vehicle. The image data may also indicate there is a first set of lane markings immediately adjacent to the left of the vehicle and a second set of lane markings between 9 and 15 feet away from the first set of way markings. Furthermore, the image data may indicate there are solid, yellow lane markings between 9 and 15 feet away from the second set of lane markings. Accordingly, the lane determination module 110 may determine that there are three lanes, and that the vehicle is in a right lane of the three lanes. Some embodiments may not include step 425.

Referring to FIG. 4 in conjunction with FIG. 3, at step 430, the vehicle recommendation system 11 obtains vehicle recommendation data from other vehicles in the platoon using the DSRC system 235, which operates on short-range wireless communication channels designed for vehicle-to-vehicle (V2V) communication. V2V communication may utilize, for example, a radio signal at 5.9 GHz, wherein DSRC transceivers of the DSRC system 235 transmit and receive radio signals in a 75 MHz band around 5.9 GHz. Accordingly, the vehicle recommendation module 150 may receive vehicle recommendations from a set of vehicles in the vehicle platoon 280. Some embodiments may not include step 430.

At step 435, the vehicle recommendation system 11 generates a vehicle recommendation. In some embodiments, the vehicle recommendation system 11 generates the vehicle recommendation based on at least one of the weight distribution, the steering wheel position data, the vehicle speed, the trajectory of the vehicle, the occupied lane, and the vehicle recommendation data from other vehicles in the platoon. As described above, the vehicle recommendation may indicate a suggested vehicle speed, a suggested lane of a roadway system, and a suggested magnitude of steering wheel rotation. The vehicle recommendations may include a notification that may be output using at least one of the notification circuit 260, the vehicle display system 250, and the vehicle audio system 270.

In some embodiments, the notification may be outputted by selectively activating the notification circuit 260 based on the vehicle recommendation. As a non-limiting example, the notification circuit 260, which may be a plurality of light emitting diodes (LEDs) disposed on an interior and/or exterior of the vehicle, may be selectively activated based on the weight distribution (e.g., the LEDs emit a red color if the weight distribution is not within an optimal weight distribution range, and the LEDs emit a green color if the weight distribution is within the optimal weight distribution range).

In some embodiments, the notification may be outputted by generating an auditory alert corresponding to the vehicle recommendation using the vehicle audio system 270. As a non-limiting example, the vehicle audio system 270 may generate an auditory alert corresponding to the weight distribution of the vehicle and the trajectory associated with the vehicle.

In some embodiments, the notification may cause the vehicle display system 250 to display text and/or graphics. As a non-limiting example, the vehicle display system 250 may display text and/or graphics indicating at least one of a suggested vehicle speed adjustment, a suggested magnitude of steering wheel rotation, and a suggested lane of a roadway based on the vehicle recommendation. As another non-limiting example and as described below in further detail with reference to FIGS. 5A-5D, the vehicle display system 250 may display text and/or other graphics suggesting that the user reduce the vehicle's speed, use a particular lane, and rotate the wheel at a certain angle while making an upcoming turn.

In some embodiments, the vehicle display system 250 may display text and/or graphics indicating the determined weight distribution, the occupied lane, the steering wheel position, the vehicle speed, and/or the trajectory of the vehicle. As a non-limiting example, the vehicle display system 250, which may include a touchscreen display, generates an image of the vehicle and a heat map representing the weight distribution, as described below in further detail with reference to FIGS. 5A-5D.

In some embodiments, the vehicle recommendation module 150 may generate the vehicle recommendation based on the weight distribution determined by the weight distribution module 100. As described above, the weight distribution may be determined based on data obtained by the one or more weight sensors 160, the accelerometer 170, and the one or more cameras 180. Additionally, the vehicle recommendation module 150 may generate the vehicle recommendation based on the trajectory associated with the vehicle as determined by the navigation module 140. As described above, the navigation module 140 may determine the trajectory of the vehicle based on trajectory data obtained by the GNSS sensor 240 and/or the predetermined trajectory of the vehicle obtained via one of the mobile device 190 and the vehicle display system 250.

As a non-limiting example, the trajectory information may indicate that the vehicle is approaching a sharp curve of the roadway, and the vehicle will need to turn to the right at the sharp curve. Furthermore, the weight distribution may indicate that the vehicle is overloaded on the left side of the vehicle. Accordingly, the vehicle recommendation module 150 may generate a vehicle recommendation instructing the vehicle to slow down to a particular speed (e.g., 15 mph), to rotate the steering wheel at a particular angle (e.g., 130°), and to utilize a particular lane of the roadway (e.g., a lane furthest to the right of the roadway).

As another non-limiting example, the trajectory information may indicate that the vehicle is traveling on a roadway having a 6% grade (i.e., the roadway is elevated), the vehicle is approaching a sharp curve of the roadway, and the vehicle will need to turn to the left at the sharp curve. Furthermore, the weight distribution may indicate that the vehicle is overloaded on the rear of the vehicle. Accordingly, the vehicle recommendation module 150 may generate a vehicle recommendation instructing the vehicle to slow down to a particular speed (e.g., 5 mph), to rotate the steering wheel at a particular angle (e.g., 145°), and to utilize a particular lane of the roadway (e.g., a lane furthest to the right of the roadway).

By generating the vehicle recommendations, the performance of the vehicle may be optimized, and various components of the vehicle will refrain from being damaged or breaking due to the weight distribution and the trajectory associated with the vehicle. It should be understood that in other embodiments, the vehicle recommendation may be based on the occupied lane, the steering wheel position, and/or the vehicle speed.

In various embodiments, the vehicle recommendation module 150 may receive vehicle recommendations generated by other vehicles in the vehicle platoon 280 using the DSRC system 235. If, for example, a set of vehicles of the vehicle platoon 280 generate vehicle recommendations having similar characteristics, such as a recommended speed or lane, the vehicle recommendation module 150 may adjust the generated vehicle recommendation such that it corresponds to the vehicle recommendations of the set of vehicles of the vehicle platoon 280. As a non-limiting example, if the set of vehicles of the vehicle platoon 280 generate vehicle recommendations indicating a first suggested lane, the vehicle recommendation module 150 may adjust the vehicle recommendation such that the suggested lane of the vehicle is the first suggested lane.

A description of various example recommendations of the vehicle recommendation system 11 will now be provided.

With reference to FIGS. 5A-5D, example recommendations generated by the vehicle recommendation module 150 and displayed by the vehicle display system 250 are schematically depicted. As described above, the vehicle recommendations generated by the vehicle recommendation module 150 may be based on the weight distribution and the trajectory data associated with the vehicle. In some embodiments, the vehicle recommendation may be generated based on the steering wheel position, the vehicle speed, the occupied lane, and/or vehicle recommendations obtained from other vehicles, as described above. Furthermore, the vehicle recommendation may cause the vehicle display system 250 to generate a notification representing at least one of the weight distribution, the suggested vehicle speed adjustment, the suggested magnitude of steering wheel rotation, and a suggested lane of a roadway.

As shown in the illustrated embodiments, the vehicle recommendation, which is generated by the vehicle recommendation module 150, may cause the vehicle display system 250 to generate a weight distribution recommendation 310 based on the weight distribution. In some embodiments, the weight distribution recommendation 310 may include a vehicle graphical representation 312 corresponding to the vehicle and a payload graphical representation 314 corresponding to a position and weight distribution of the load components 70. As a non-limiting example, the payload graphical representation 314 may be a heat map including grid components 316, wherein each of the grid components 316 includes a color representing the amount of weight applied to the corresponding location of the vehicle. In other embodiments, the grid components 316 may represent the amount of weight applied to the corresponding location of the vehicle using a grayscale color scheme, patterns, letters, numbers, or other visual indications corresponding to the applied weight. It should be understood the weight distribution recommendation 310 may include text and/or other graphics in other embodiments to represent the weight distribution.

In some embodiments, the weight distribution recommendation 310 may include text and/or graphics representing instructions to adjust the weight distribution of the vehicle. As a non-limiting example, the weight distribution recommendation 310 may include text and/or graphics that instruct a user of the vehicle to adjust a tire pressure of at least one of the tires 95 such that the weight distribution of the vehicle is set at the optimal weight distribution. As another non-limiting example, the weight distribution recommendation 310 may include text and/or graphics that instruct a user of the vehicle to move at least one of the load components 70 to a new location within the bed 60 or the container 92 such that the weight distribution of the vehicle is set at the optimal weight distribution. As another non-limiting example, the weight distribution recommendation 310 may include text and/or graphics indicating that the weight distribution of the vehicle is undesirable and/or mechanical robustness of the vehicle. As another non-limiting example, the weight distribution recommendation 310 may include text and/or graphics indicating that the weight distribution of the vehicle has changed due to the load components 70 moving within the bed 60 or the container 92 during the operation of the vehicle.

Figure 5A:
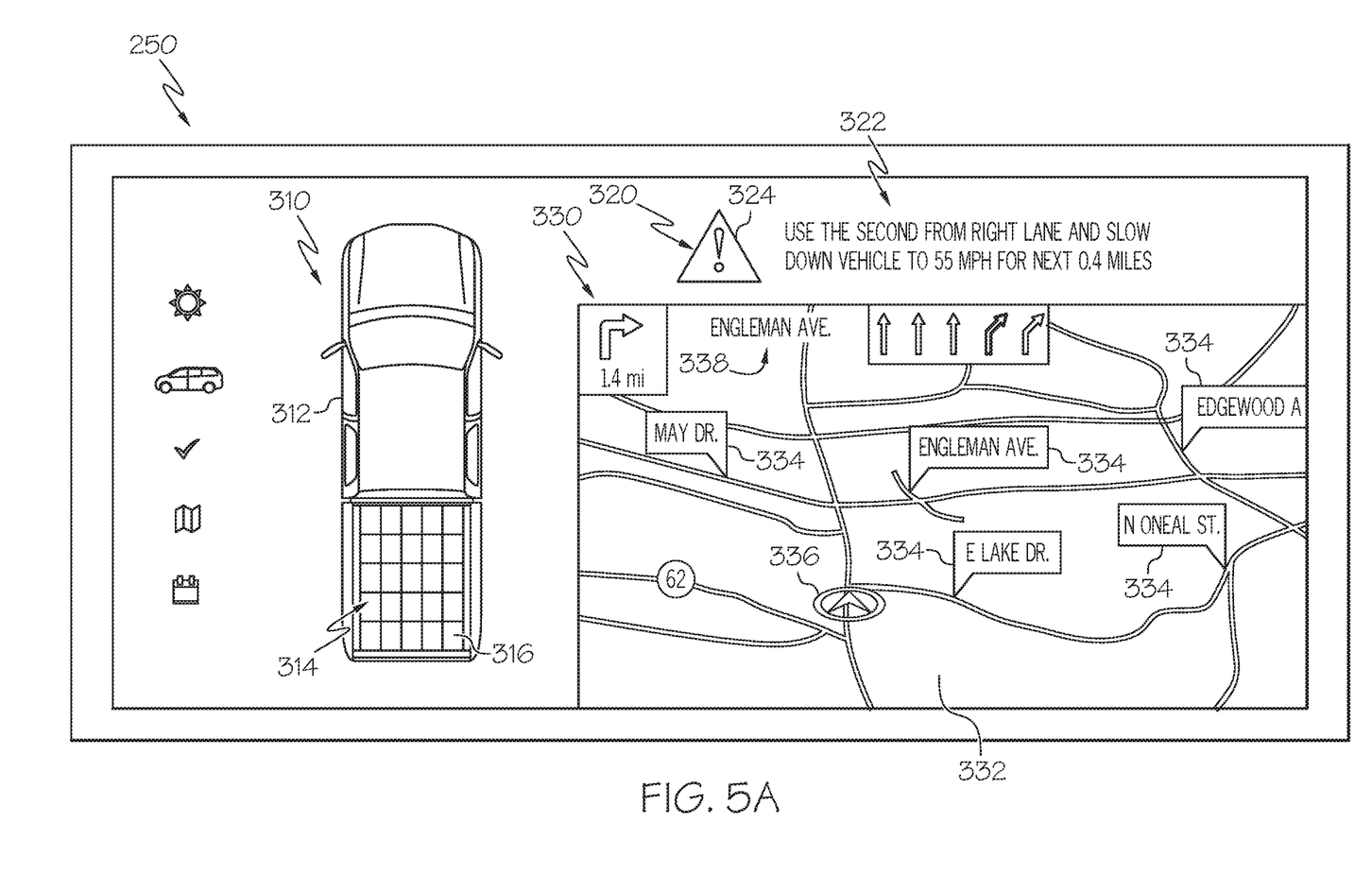
FIG. 5A schematically depicts an example recommendation generated by a vehicle recommendation system according to one or more embodiments shown and described herein.

As shown in the illustrated embodiments, the vehicle recommendation may cause the vehicle display system 250 to generate a recommendation 320 that is located near and/or overlays a mapping interface 330 of the vehicle display system 250. As a non-limiting example, the mapping interface 330 may display, using a map, text, and/or other graphics, the trajectory of the vehicle determined by the navigation module 140, as described above in FIG. 3. As schematically illustrated in FIG. 5A, the mapping interface 330 includes a map 332, text 334 indicating a street name of the map 332, a marker 336 indicating a location of the vehicle with respect to the map 332, and a header portion 338 representing the navigation instructions.

Figure 5B:
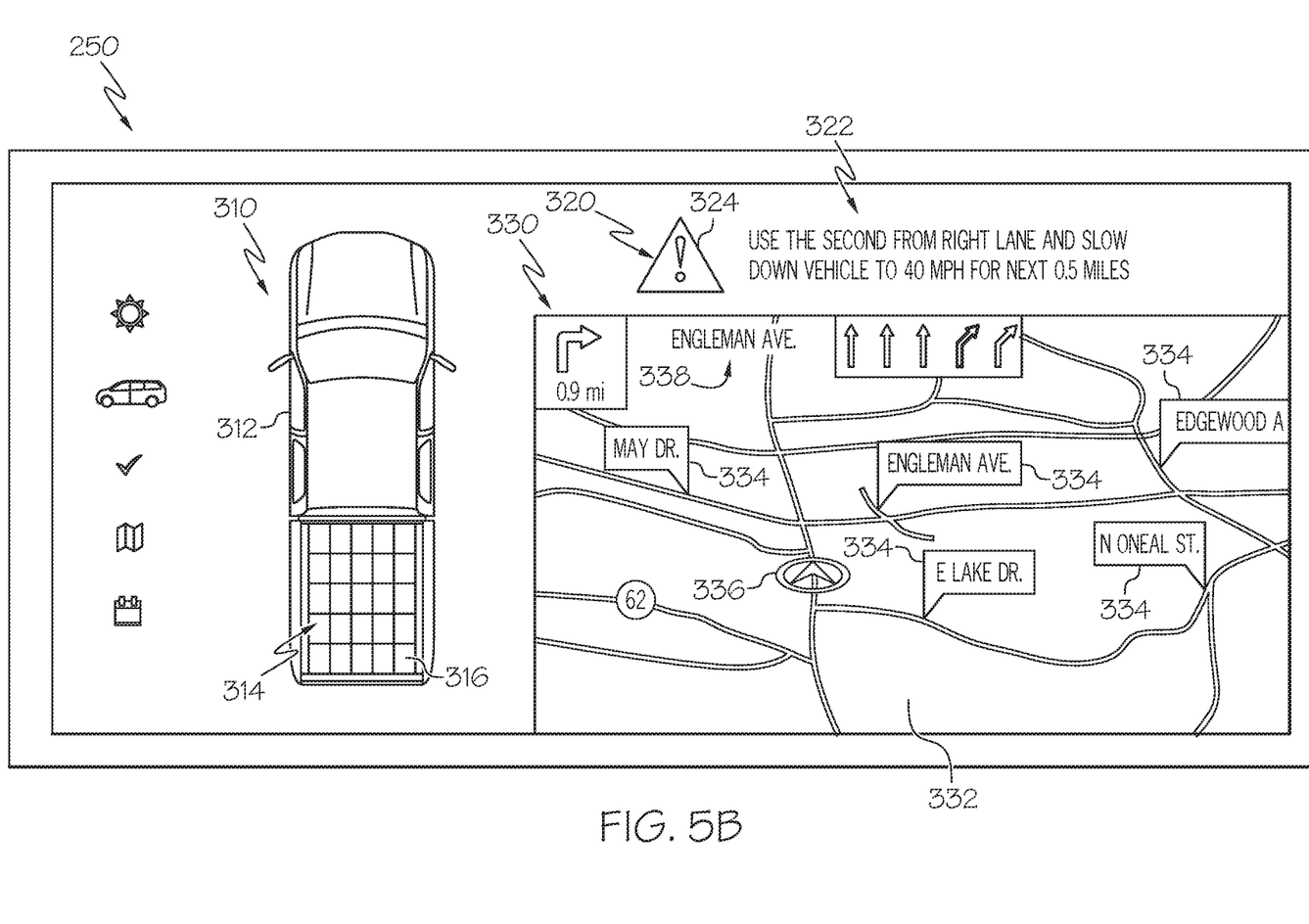
FIG. 5B schematically depicts another example recommendation generated by a vehicle recommendation system according to one or more embodiments shown and described herein.
Figure 5C:
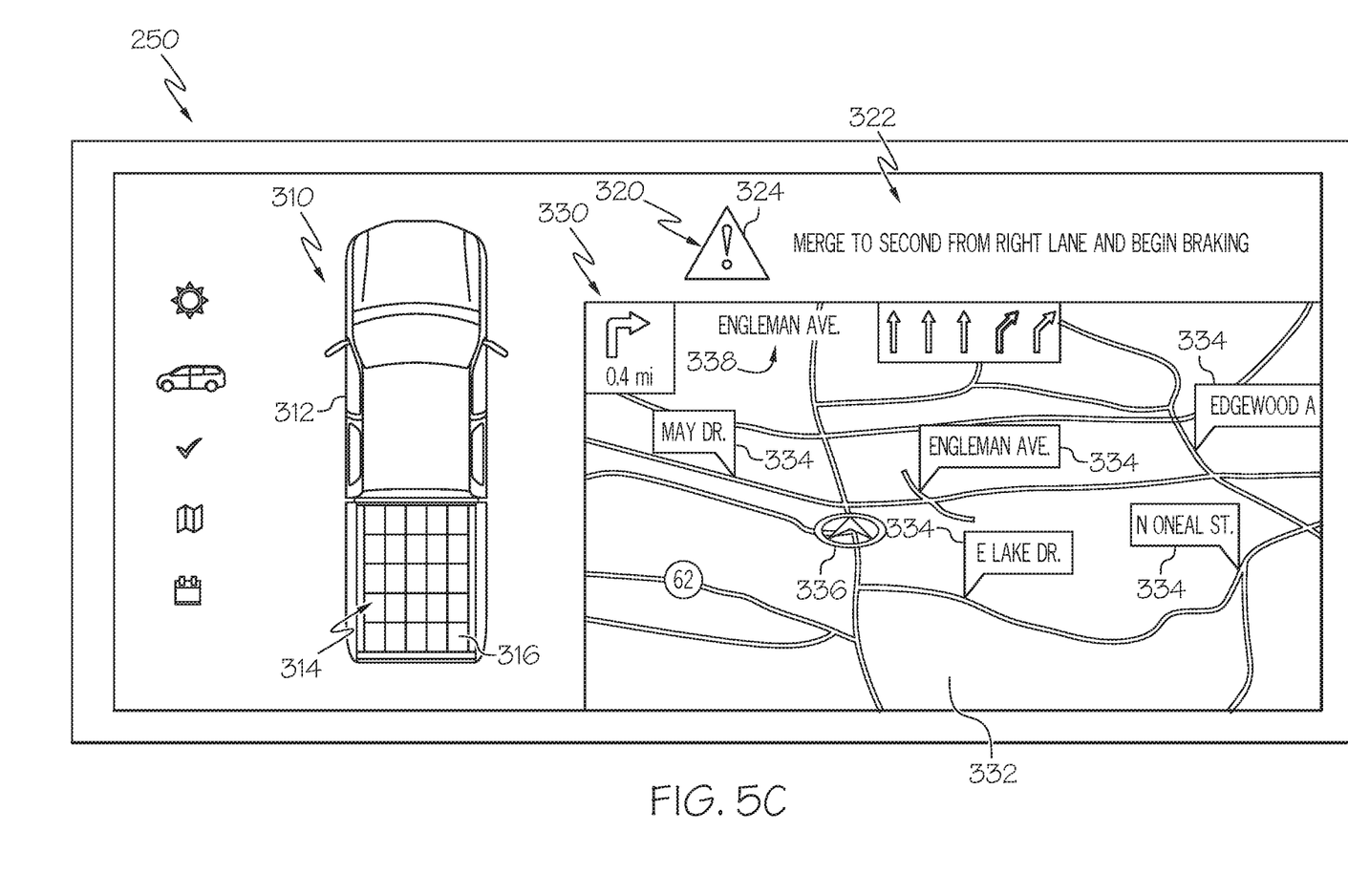
FIG. 5C schematically depicts yet another example recommendation generated by a vehicle recommendation system according to one or more embodiments shown and described herein.
Figure 5D:
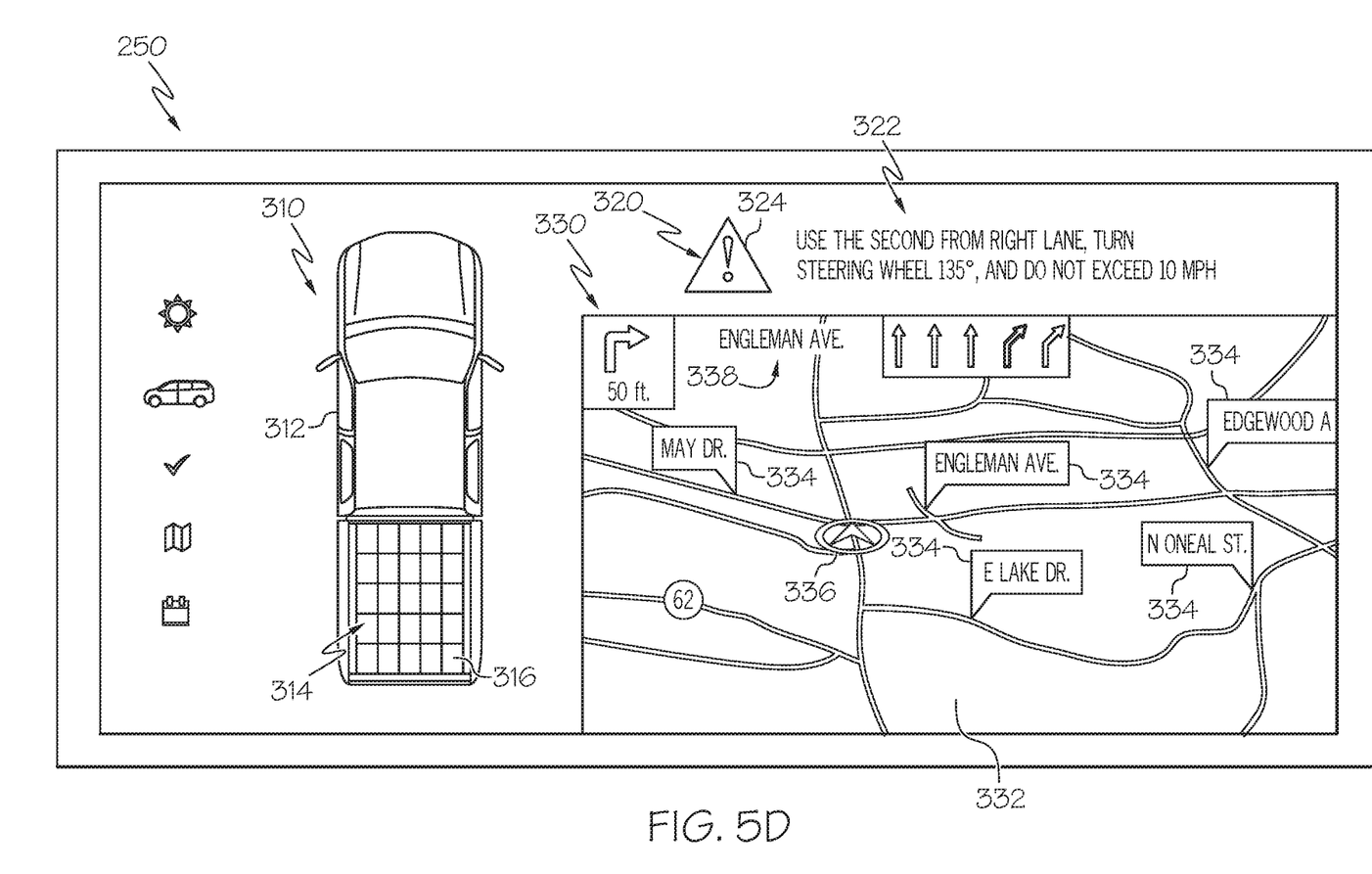
FIG. 5D schematically depicts yet another example recommendation generated by a vehicle recommendation system according to one or more embodiments shown and described herein.

In some embodiments, the recommendation 320 may include a text portion 322 representing at least one of suggested the vehicle speed adjustment, the suggested magnitude of steering wheel rotation, and a suggested lane of a roadway. As a non-limiting example and as schematically depicted in FIG. 5A, the text portion 322 of the recommendation 320 may instruct the user to use a particular lane and slow the vehicle down to a suggested speed for a particular distance. Furthermore, in some embodiments, the recommendation 320 may include a graphic portion 324 indicating an urgency of the recommendation 320. As the user continues to operate the vehicle, the recommendation 320 may be updated based on the updated vehicle recommendation generated by the vehicle recommendation module 150. As a non-limiting example and as schematically depicted in FIGS. 5B-5D, the text portion 322 of the recommendation 320 may be updated to represent the updated vehicle recommendations as the vehicle continues to operate on the roadway system. As shown in the illustrated embodiment of FIG. 5B, which may be displayed by the vehicle display system 250 once the vehicle has slowed down the vehicle to 55 mph and/or has traveled 0.4 miles (as indicated by the text portion 322 in FIG. 5A), the text portion 322 may be updated to instruct the user to use the second from right lane of the roadway and to slow down the vehicle to 40 mph for the next 0.5 miles. As shown in the illustrated embodiment of FIG. 5C, which may be displayed by the vehicle display system 250 once the vehicle has slowed down the vehicle to 45 mph and/or has traveled 0.5 miles (as indicated by the text portion 322 in FIG. 5B), the text portion 322 may be updated to instruct the user merge to the second from right lane and begin braking. As shown in the illustrated embodiment of FIG. 5D, which may be displayed by the vehicle display system 250 once the vehicle has merged to the right lane and/or has begun braking (as indicated by the text portion 322 in FIG. 5C), the text portion 322 may be updated to instruct the user to use the second from right lane of the roadway, turn the steering wheel 135°, and to not to exceed 10 mph.

It should be understood that in other embodiments, the recommendation 320 may indicate various other suggested vehicle operating characteristics. As a non-limiting example, the recommendation 320 may instruct the user of the vehicle to adjust the vehicle's speed in order to avoid damage to a particular component of the vehicle. As another non-limiting example, the text portion 322 of the recommendation 320 may instruct the user of the vehicle to operate the vehicle at a suggested speed due to the elevation of the roadway system, and the graphic portion 324 may be a graphic indicating that it is critical for the vehicle to abide by the recommendation. As another non-limiting example, the text portion 322 may instruct the user of the vehicle to use a particular lane and operate at a suggested speed when taking a turn in order to prevent the vehicle from tipping due to the weight distribution, and the graphic portion 324 may be a graphic indicating that it is critical for the vehicle to abide by the recommendation. As another non-limiting example, the text portion 322 may instruct the user of the vehicle to maintain a certain distance between an adjacent vehicle as a result of the reduced braking capacity caused by the weight distribution.

While the above embodiments describe the vehicle recommendation causing the vehicle display system 250 to display certain text and/or graphics based on the vehicle recommendation, in some embodiments, the vehicle recommendation may selectively activate the notification circuit 260 based on the vehicle recommendation. As a non-limiting example, the notification circuit 260, which may be a plurality of LEDs disposed on the exterior of the vehicle, may be selectively activated to alert other vehicles of the reduced braking capacity of the vehicle. As another non-limiting example, the notification circuit 260 may be selectively activated to alert vehicles located behind the vehicle to adjust the respective operating conditions (e.g., adjust a speed of the respective vehicles, a suggested degree of steering wheel rotation, etc.) based on vehicle recommendations generated by other vehicles that are in front of the vehicle and in the vehicle platoon 280.

It should now be understood that embodiments of the present disclosure are directed to vehicle recommendation systems that are configured to generate vehicle recommendations based on, for example, a weight distribution of the vehicle and the trajectory of the vehicle. As a non-limiting example, if the weight distribution indicates that a certain area of the vehicle is overloaded compared to the rest of the vehicle, the vehicle recommendation system may generate a recommendation with text and/or graphics indicating that the identified area of the vehicle is overloaded and to recommend the user to operate the vehicle at, for example, a suggested vehicle speed. By generating the recommendation, the vehicle recommendation system may improve vehicle operation and maintain a mechanical robustness of the vehicle during operation when, for example, the weight distribution indicates a particular portion of the vehicle is overloaded.

It will be apparent to those skilled in the art that various modifications and variations can be made without departing from the spirit or scope of the disclosure. Since modifications, combinations, sub-combinations and variations of the disclosed embodiments incorporating the spirit and substance of the disclosure may occur to persons skilled in the art, the disclosure should be construed to include everything within the scope of the appended claims and their equivalents.

The invention claimed is:

1. A system comprising:
one or more processors; and
one or more non-transitory memory modules communicatively coupled to the one or more processors and storing machine-readable instructions that, when executed, cause the one or more processors to:
determine a weight distribution of a vehicle loaded with load components;
determine a trajectory associated with the loaded vehicle; and
generate a vehicle recommendation based on the weight distribution of the loaded vehicle and the trajectory associated with the loaded vehicle,
wherein the generated vehicle recommendation is to reposition the load components within the loaded vehicle to improve the weight distribution of the loaded vehicle.

2. The system of claim 1, wherein the machine-readable instructions, when executed, cause the one or more processors to:
obtain weight data from one or more weight sensors; and
determine the weight distribution of the loaded vehicle based on the weight data.

3. The system of claim 2, wherein:
the one or more weight sensors are a plurality of tire pressure sensors;
the weight data are pressure values generated by the plurality of tire pressure sensors; and
determining the weight distribution of the loaded vehicle based on the weight data further comprises:
determining a weight of the load components based on the pressure values;
determining a center of gravity of the load components based on a location of the load components within the loaded vehicle and a distance between a front axle of the loaded vehicle and a rear axle of the loaded vehicle; and
determining the weight distribution of the loaded vehicle based on the center of gravity of the load components and the weight of the load components.

4. The system of claim 2, wherein the machine-readable instructions, when executed, cause the one or more processors to:
determine whether the weight distribution of the loaded vehicle has changed based on data obtained from at least one of a camera and an accelerometer;
in response to a determination that the weight distribution of the loaded vehicle has changed, determine an updated weight distribution of the loaded vehicle based on the weight data; and
generate an updated recommendation based on the updated weight distribution of the loaded vehicle and the trajectory associated with the loaded vehicle.

5. The system of claim 1, wherein the machine-readable instructions, when executed, cause the one or more processors to:
generate the vehicle recommendation based on a speed of the loaded vehicle.

6. The system of claim 1, wherein the machine-readable instructions, when executed, cause the one or more processors to:
generate the vehicle recommendation based on a steering wheel position.

7. The system of claim 1, wherein the machine-readable instructions, when executed, cause the one or more processors to:
obtain lane data from a camera, wherein the lane data represents a lane of a roadway that the loaded vehicle is occupying; and
generate the vehicle recommendation based on the lane data.

8. The system of claim 1, wherein the machine-readable instructions, when executed, cause the one or more processors to:
obtain second vehicle recommendation data using a dedicated short range communication (DSRC) system, wherein:
the second vehicle recommendation data represents a second vehicle recommendation associated with a second vehicle; and
the second vehicle recommendation data is obtained from the second vehicle; and
generate the vehicle recommendation based on the second vehicle recommendation data.

9. The system of claim 1, wherein the vehicle recommendation is configured to cause the loaded vehicle to generate a visual indication representing at least one of a suggested vehicle speed adjustment, a suggested magnitude of steering wheel rotation, and a suggested lane of a roadway.

10. A method comprising:
determining a weight distribution of a vehicle loaded with load components based on weight data from one or more weight sensors;
determining a trajectory associated with the loaded vehicle; and
generating a vehicle recommendation based on the weight distribution of the loaded vehicle and the trajectory associated with the loaded vehicle,
wherein the generated vehicle recommendation is to reposition the load components within the loaded vehicle to improve the weight distribution of the loaded vehicle.

11. The method of claim 10, wherein:
the one or more weight sensors are a plurality of tire pressure sensors;
the weight data are pressure values generated by the plurality of tire pressure sensors; and
determining the weight distribution of the loaded vehicle based on the weight data further comprises:
determining a weight of the load components of the loaded vehicle based on the pressure values;
determining a center of gravity of the load components based on a location of the load components within the loaded vehicle and a distance between a front axle of the loaded vehicle and a rear axle of the loaded vehicle; and
determining the weight distribution of the loaded vehicle based on the center of gravity of the load components and the weight of the load components.

12. The method of claim 10, further comprising:
determining whether the weight distribution of the loaded vehicle has changed based on data obtained from at least one of a camera and an accelerometer;

in response to a determination that the weight distribution of the loaded vehicle has changed, determining an updated weight distribution of the loaded vehicle based on the weight data; and generating an updated recommendation based on the updated weight distribution of the loaded vehicle and the trajectory associated with the loaded vehicle.

13. The method of claim 10, further comprising:
obtaining speed data from a speed sensor, wherein the speed data represents a speed of the loaded vehicle; and
generating the vehicle recommendation based on the speed data.

14. The method of claim 10, further comprising:
obtaining steering wheel position data from a steering wheel position sensor, wherein the steering wheel position data represents an angular position of a steering wheel of the loaded vehicle; and
generating the vehicle recommendation based on the steering wheel position data.

15. The method of claim 10, further comprising:
obtaining lane data from a camera, wherein the lane data represents a lane of a roadway that the loaded vehicle is occupying; and
generating the vehicle recommendation based on the lane data.

16. The method of claim 10, further comprising:
obtaining second vehicle recommendation data using a dedicated short range communication (DSRC) system, wherein:
the second vehicle recommendation data represents a second vehicle recommendation associated with a second vehicle; and
the second vehicle recommendation data is obtained from the second vehicle; and
generating the vehicle recommendation based on the second vehicle recommendation data.

17. The method of claim 10, wherein determining the trajectory comprises:
obtaining trajectory data from at least one of a global navigation satellite system (GNSS) sensor of the loaded vehicle and an input device in communication with the loaded vehicle.

18. The method of claim 10, wherein the vehicle recommendation is configured to cause the loaded vehicle to generate a visual indication representing at least one of a suggested vehicle speed adjustment, a suggested magnitude of steering wheel rotation, and a suggested lane of a roadway.

19. A vehicle comprising:
one or more processors; and
one or more non-transitory memory modules communicatively coupled to the one or more processors and storing machine-readable instructions that, when executed, cause the one or more processors to:
determine a weight distribution of the vehicle loaded with load components;
determine a trajectory associated with the loaded vehicle; and
generate a vehicle recommendation based on the weight distribution of the loaded vehicle and the trajectory associated with the loaded vehicle,
wherein the generated vehicle recommendation is to reposition the load components within the loaded vehicle to improve the weight distribution of the loaded vehicle.

20. The vehicle of claim 19, wherein the machine-readable instructions, when executed, cause the one or more processors to:
obtain weight data from one or more weight sensors; and
determine the weight distribution of the loaded vehicle based on the weight data, wherein:
the one or more weight sensors are a plurality of tire pressure sensors;
the weight data are pressure values generated by the plurality of tire pressure sensors; and
determining the weight distribution of the loaded vehicle based on the weight data further comprises:
determining a weight of the load components of the loaded vehicle based on the pressure values;
determining a center of gravity of the load components based on a location of the load components within the loaded vehicle and a distance between a front axle of the loaded vehicle and a rear axle of the loaded vehicle; and
determining the weight distribution of the loaded vehicle based on the center of gravity of the load components and the weight of the load components.

* * * * *

UNITED STATES PATENT AND TRADEMARK OFFICE
CERTIFICATE OF CORRECTION

PATENT NO. : 11,720,805 B2
APPLICATION NO. : 16/696590
DATED : August 8, 2023
INVENTOR(S) : Stephen McFarland and Armin Lange It is certified that error appears in the above-identified patent and that said Letters Patent is hereby corrected as shown below:

On the Title Page

Column 2, item (56), U.S. patent documents, cite no. 7, delete "Su" and insert --Sujan et al.--, therefor.

In the Specification

In Column 6, Line(s) 34, after "any device", delete "of".

Signed and Sealed this
Nineteenth Day of September, 2023

Katherine Kelly Vidal
*Director of the United States Patent and Trademark Office*